(12) United States Patent
Westerweller et al.

(10) Patent No.: US 11,159,094 B2
(45) Date of Patent: Oct. 26, 2021

(54) CONVERTER ARRANGEMENT HAVING A PHASE MODULE ARRESTER AND METHOD FOR SHORT-CIRCUIT PROTECTION THEREOF

(71) Applicant: SIEMENS AKTIENGESELLSCHAFT, Munich (DE)

(72) Inventors: Thomas Westerweller, Stegaurach (DE); Matthias Burkhardt, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/633,974

(22) PCT Filed: Jul. 27, 2017

(86) PCT No.: PCT/EP2017/069044
§ 371 (c)(1),
(2) Date: Jan. 24, 2020

(87) PCT Pub. No.: WO2019/020186
PCT Pub. Date: Jan. 31, 2019

(65) Prior Publication Data
US 2020/0212792 A1  Jul. 2, 2020

(51) Int. Cl.
*H02M 7/483* (2007.01)
*H02J 3/36* (2006.01)
(Continued)

(52) U.S. Cl.
CPC ............. *H02M 7/4835* (2021.05); *H02J 3/36* (2013.01); *H02M 1/36* (2013.01); *H02M 7/49* (2013.01)

(58) Field of Classification Search
CPC ...................................................... H02M 1/32
See application file for complete search history.

(56) References Cited

U.S. PATENT DOCUMENTS 3,697,819 A * 10/1972 Eichelberger .......... H02B 13/02
                                                              361/603
2011/0019449 A1   1/2011 Katoh et al.
(Continued)

FOREIGN PATENT DOCUMENTS

CN          103066582 A      4/2013
DE      102009034354 A1      1/2011
(Continued)

*Primary Examiner* — Peter M Novak
(74) *Attorney, Agent, or Firm* — Laurence A. Greenberg; Werner H. Stemer; Ralph E. Locher

(57) ABSTRACT

A converter arrangement includes a converter phase extending between first and second DC voltage poles. The converter phase includes an AC voltage terminal, a first converter arm extending between the first DC voltage pole and the AC voltage terminal and a second converter arm extending between the AC voltage terminal and the second DC voltage pole. The first converter arm includes a first series circuit of two-pole switching modules and the second converter arm includes a second series circuit of two-pole switching modules. Each of the switching modules includes power semiconductor switches and an energy store. A phase module arrester in an arrester branch is parallel with the two series circuits of the switching modules. The phase module arrester is configured for overvoltage protection of the switching modules of the two series circuits. A method for short-circuit protection of the converter arrangement is also provided.

7 Claims, 3 Drawing Sheets

(51) Int. Cl.
*H02M 1/36* (2007.01)
*H02M 7/49* (2007.01)

(56) References Cited

U.S. PATENT DOCUMENTS

2012/0120691 A1 5/2012 Armschat et al.
2019/0386578 A1* 12/2019 Kajiyama ............. H02M 7/483

FOREIGN PATENT DOCUMENTS

EP 3001552 A1 3/2016
WO WO 2014114339 A1 7/2014
WO WO 2016107616 A1 7/2016

* cited by examiner

CONVERTER ARRANGEMENT HAVING A PHASE MODULE ARRESTER AND METHOD FOR SHORT-CIRCUIT PROTECTION THEREOF

BACKGROUND OF THE INVENTION

Field of the Invention

The invention relates to a converter arrangement having a converter phase which extends between a first and a second DC voltage pole, wherein the converter phase comprises an AC voltage terminal and a first converter arm, which extends between the first DC voltage pole and the AC voltage terminal, and a second converter arm, which extends between the AC voltage terminal and the second DC voltage pole, wherein the first converter arm comprises a first series circuit of two-pole switching modules, and the second converter arm comprises a second series circuit of two-pole switching modules, wherein each of the switching modules comprises power semiconductor switches and an energy store.

A converter arrangement of this type is generally described as a modular multi-stage converter, and is known, for example, from DE 10 2009 034 354 A1.

Customarily, a generic converter arrangement is connected in service on the AC side, i.e. by means of the AC voltage terminal, to an AC grid system. If the converter arrangement assumes a multi-phase, for example a three-phase configuration, it is connected to a correspondingly multi-phase AC grid system. The DC voltage poles of the converter arrangement are connected to a DC line or a DC grid system. In a "symmetrical monopole" configuration, for example, the first DC voltage pole can lie at a positive electric potential, and the second DC voltage pole can lie at a negative electric potential. In a "bipole" configuration, the first DC voltage pole, for example, lies at a positive potential, and the second at a ground potential.

Grid system faults, for example AC-side faults, and specifically asymmetrical, i.e. single-phase faults such as short-circuits associated with line-to-ground faults, in a multi-phase AC grid system can result in a potential displacement in the converter arrangement. If the converter arrangement is connected to the AC grid system via a transformer, a potential displacement can occur, specifically in the event of asymmetrical faults arising on the converter side of the transformer. Single-pole line-to-ground faults on the DC voltage side of the converter arrangement can result in the charging described herein. In response to a potential displacement of this type, an overcharging of the energy stores of the switching modules can occur. This overcharging can result in the damage or destruction of the affected switching modules, and consequently in the failure of the converter arrangement. In a number of known converter installations, this problem has previously been counteracted by an increase in the number of switching modules in each converter arm which, however, is disadvantageously associated with an increase in the costs of the converter installation.

SUMMARY OF THE INVENTION

The object of the invention is the proposal of a converter arrangement of the above-mentioned type, which is as reliable and as cost-effective as possible.

In a generic converter arrangement, this object is fulfilled by a phase module arrester in an arrester branch arranged in parallel with the two series circuits of the switching modules, which is configured for the overvoltage protection of the switching modules of the two series circuits.

Advantageously, the phase module arrester provides overvoltage protection for the switching modules of the two series circuits, specifically in the event of a short-circuit on the AC side of the converter arrangement, resulting in displaced-potential grid-side currents which can no longer be promptly cleared by an AC-side power circuit-breaker. The same also applies to DC faults in a symmetrical monopole arrangement of said converter arrangement. The phase arrester limits any charging of the switching modules, and thus protects the latter against overcharging. In this manner, moreover, the above-mentioned increase in the number of switching modules can advantageously be omitted.

The converter arrangement can also be configured to a three-phase design. To this end, the converter arrangement appropriately comprises three converter phases, which are arranged in parallel with one another between the first and the second DC voltage pole. The three converter phases can be of identical design. A three-phase converter arrangement is customarily connectable to a corresponding three-phase AC grid system. Each of the converter phases can be provided with a dedicated phase module arrester.

Preferably, a first arm inductance, which is arranged in the first converter arm between the first DC voltage pole and the first series circuit of switching modules, and a second arm inductance, which is arranged in the second converter arm between the second DC voltage pole and the second series circuit of switching modules, are provided. The arm inductances are appropriately smoothing reactors, which are responsible for the smoothing of DC-side currents. The arrester branch preferably extends between a first potential point, which is arranged between the first arm inductance and the first series circuit of switching modules, and a second potential point, which is arranged between the second arm inductance and the second series circuit of switching modules. The phase module arrester is thus connected in parallel with the two series circuits of switching modules. However, it does not bridge the arm inductances.

The phase module arrester preferably assumes a protective level in excess of 100 kV. The protective level is the voltage which is limited across the terminals of the phase module arrester (at the rated arrester current). The phase module arrester can thus deliver corresponding protection, even in high-voltage applications, such as high-voltage direct current (HVDC) transmission systems.

The phase module arrester is preferably configured without a housing. In this manner, a stationary energy take-up capability and an adequate thermal stability of the phase module arrester can be ensured. The phase module arrester can be provided, for example, in a suspended arrangement.

According to one form of embodiment of the invention, the power semiconductor switches and the energy store of the switching modules are mutually connected in a half-bridge circuit. In the half-bridge circuit, the switching module comprises two power semiconductor switches, which are connected to one another in series. The energy store, for example in the form of a capacitor, is arranged in parallel with the power semiconductor switches. The two terminals of the switching module are connected to the power semiconductor switches or to the energy store such that a switching module voltage can be generated at the terminals which corresponds, either to the voltage across the energy store or to a zero voltage. Appropriately, a freewheeling diode is connected to each of the power semiconductor switches in an antiparallel arrangement.

In such a configuration of the converter arrangement, a fault can result in an uncontrolled flow of a short-circuit current via the freewheeling diodes of the switching modules, thus potentially resulting in an overcharging of the energy stores of the switching modules of the converter arrangement. In such a case, the phase module arrester provides particularly effective protection for the switching modules or the energy stores thereof, in that it limits the voltage across the converter phase.

The converter arrangement preferably comprises an AC-side power circuit-breaker. By means of the phase module arrester, in conjunction with the AC-side power circuit-breaker, it is also specifically possible for a single-phase fault, with phase displacement, to be cleared on the AC side of the converter arrangement.

According to one form of embodiment of the invention, a TDC-arrester is provided in each of the converter arms, which is connected in circuit between the converter arm and ground. The TDC-arrester appropriately limits a blocking voltage to ground which is generated, in the event of a fault, when the power semiconductor switches of the converter arrangement are in the blocked state. In this manner, any additional loading of the isolating distances in relation to ground due to the blocking voltage are reduced or entirely eliminated.

The converter arrangement can further comprise a TAC-arrester, which is arranged on the AC voltage terminal of the converter arrangement.

The invention further relates to a method for the short-circuit protection of a converter arrangement having a converter phase which extends between a first and a second DC voltage pole, wherein the converter phase comprises an AC voltage terminal and a first converter arm, which extends between the first DC voltage pole and the AC voltage terminal, and a second converter arm, which extends between the AC voltage terminal and the second DC voltage pole, wherein the first converter arm comprises a first series circuit of two-pole switching modules, and the second converter arm comprises a second series circuit of two-pole switching modules, wherein each of the switching modules comprises power semiconductor switches and an energy store.

The object of the invention is the provision of such a method, which reliably ensures the overcharge protection of the converter arrangement in the event of a fault.

This object is fulfilled by a generic method, wherein
an AC-side or a DC-side fault is detected
the power semiconductor switches of the switching modules assume a blocking state,
a fault current on a phase module arrester is commutated in a phase module branch, parallel to the two series circuits of switching modules and, thereafter
a power circuit-breaker arranged on the AC side of the converter phase is opened.

By means of the method according to the invention, overcharge protection for the switching modules of the converter arrangement is provided, even in the event of a potential displacement associated with a fault. Further advantages proceed from the advantages described heretofore with reference to the converter arrangement according to the invention.

In the context of the method according to the invention, naturally, all the above-mentioned features of the converter arrangement according to the invention can be employed, either individually or in combination.

BRIEF DESCRIPTION OF THE SEVERAL VIEWS OF THE DRAWING

The invention is further described hereinafter with reference to FIGS. 1 to 3.

DESCRIPTION OF THE INVENTION

Figure 1:
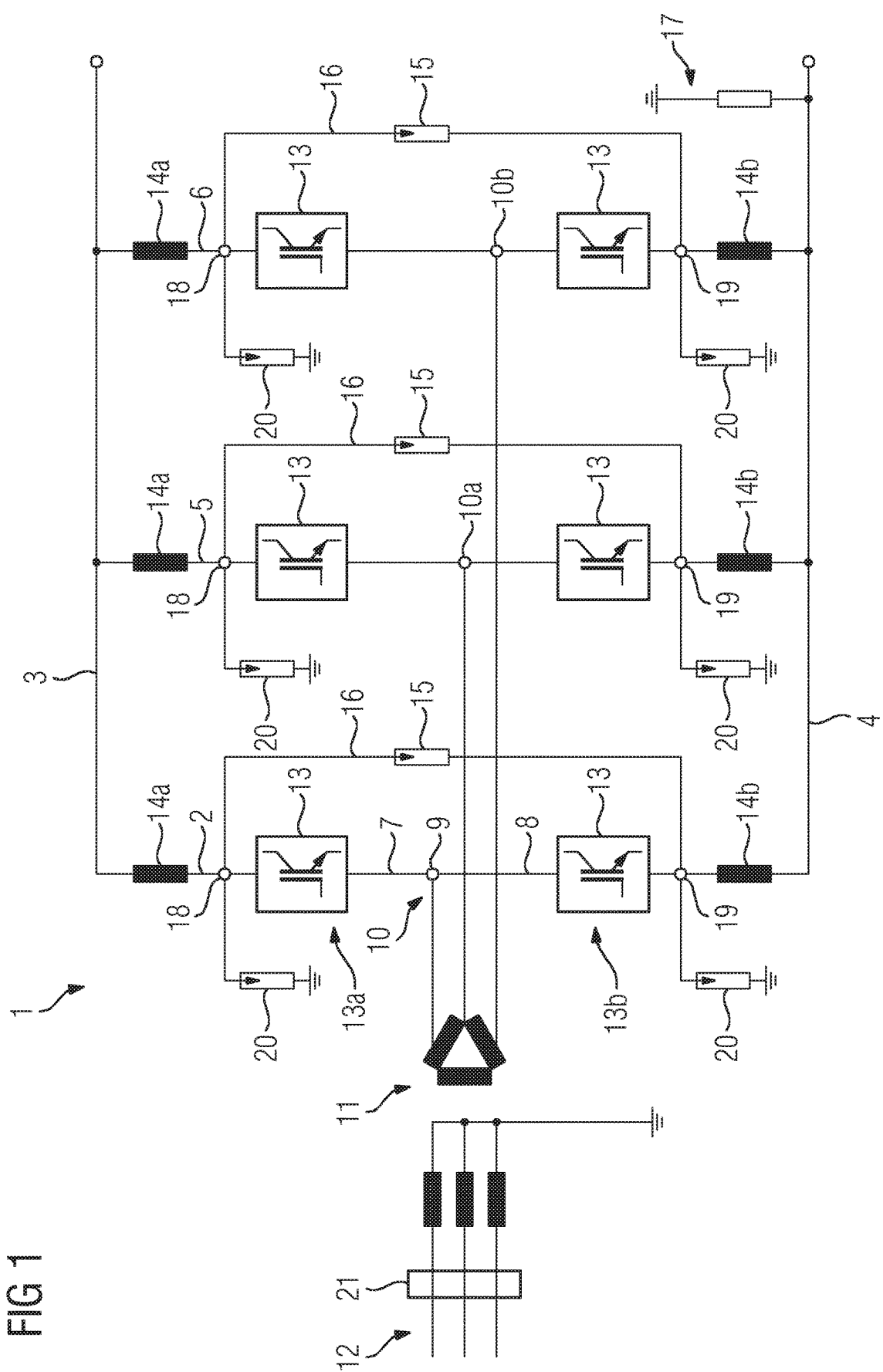
FIG. 1 shows a schematic representation of one exemplary embodiment of a converter arrangement according to the invention.

A three-phase converter arrangement 1 is represented in FIG. 1. The converter arrangement 1 comprises a first converter phase 2, which extends between a first DC voltage pole 3 and a second DC voltage pole 4. In the exemplary embodiment represented, the converter arrangement 1 is part of a bipole installation, such that the first DC voltage pole 3, during the operation of the converter arrangement, assumes a positive high-voltage potential, whereas the second DC voltage pole 4 lies at a ground potential, as indicated in FIG. 1 by a grounding arrangement 17. The converter arrangement further comprises a second converter phase 5 and a third converter phase 6, which respectively extend in parallel with the first converter phase 2 between the two DC voltage poles 3, 4. In the exemplary embodiment represented in FIG. 1, the three converter phases 2, 5 and 6 are identically configured. Consequently, in order to avoid repetitions, only the layout of the first converter phase 3 is described in detail. The first converter phase 2 comprises a first converter arm 7 and a second converter arm 8. An AC voltage terminal 10 is arranged on a connection point 9 of the two converter arms 7, 8. By means of the AC voltage terminal 10, the converter arrangement 1 is connected via a transformer 11 to an AC grid system 12. As the converter arrangement 1 is of the three-phase type, the AC voltage terminal 10 comprises three terminals 10, 10a, 10b, for connection to one phase each of the AC grid system 12.

The first converter arm 7 comprises a first series circuit 13a of two-pole switching modules 13. In the representation according to FIG. 1, in the interests of clarity, only one switching module 13 is diagrammatically represented, which simultaneously represents the series circuit 13a. In principle, however, the switching modules 13 in each of the converter arms can assume any number, and can be adapted to the respective application. A first arm inductance 14a, in the form of a smoothing reactor, is arranged in series with the first series circuit of switching modules 13. In a similar manner, the second converter arm 8 comprises a second series circuit 13b of switching modules 13 and a second arm inductance 14b.

The converter arrangement 1 further comprises a phase module arrester 15. The phase module arrester 15 is arranged in an arrester branch 16. The arrester branch 16 extends between a first potential point 18, which is arranged between the first arm inductance 14a and the first series circuit 13a of switching modules 13, and a second potential point 19, which is arranged between the second arm inductance 14b and the second series circuit 13b. The phase module arrester 15 is thus arranged in parallel with the two series circuits 13a and 13b.

Each of the converter arms 7, 8 further comprises a TDC-arrester 20 for the limitation of a blocking voltage which is generated upon the blocking of the power semiconductors of the switching modules 13. An AC voltage power circuit-breaker (AC power circuit-breaker) 21 is arranged on the AC side of the converter phases 1, 5, 6.

The mode of operation of the phase module arrester in the event of a fault is described hereinafter with reference to a further exemplary embodiment, according to FIG. 2.

Figure 2:
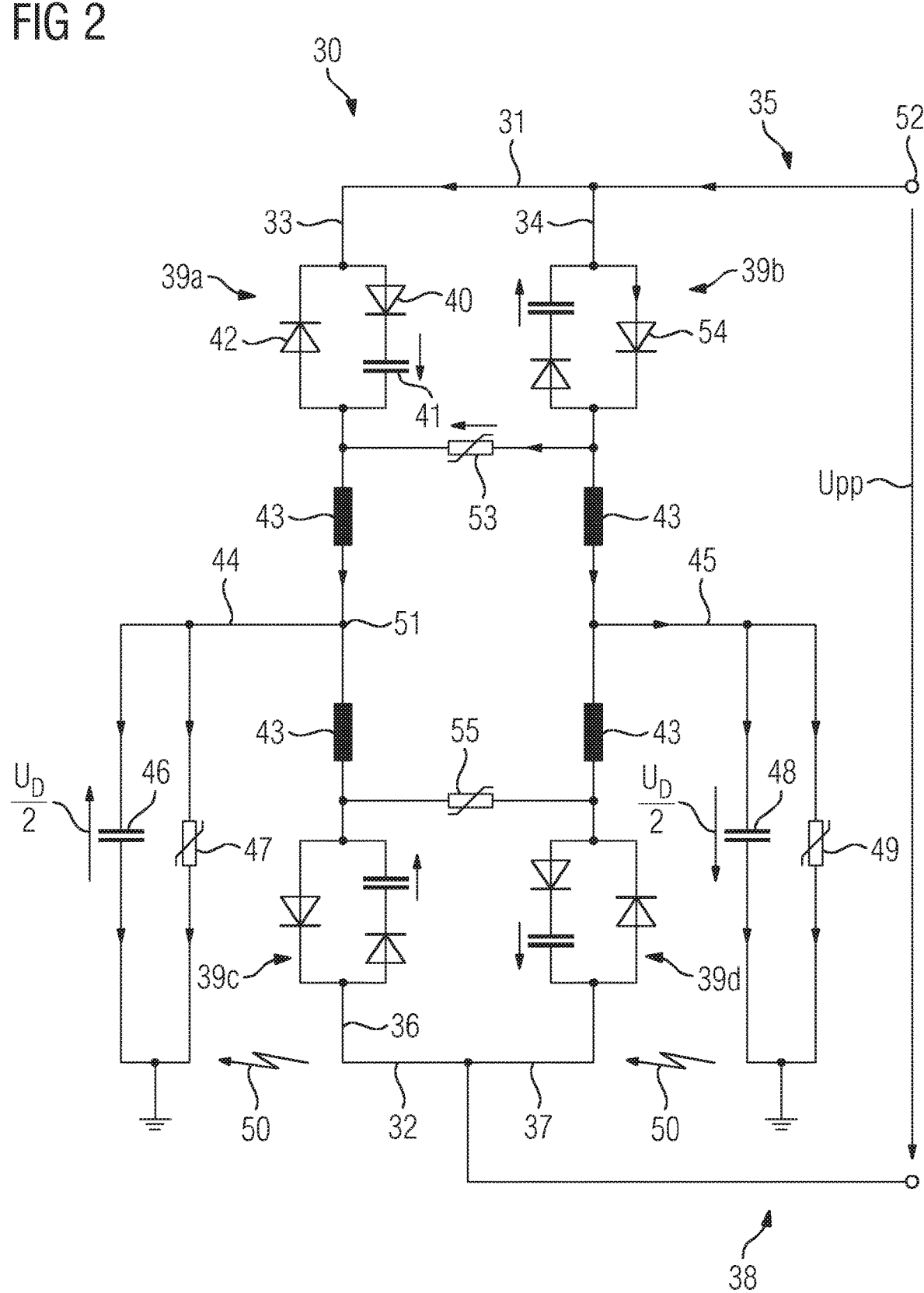
FIG. 2 shows a schematic representation of a further exemplary embodiment of the converter arrangement according to the invention.

FIG. 2 shows a converter arrangement 30. In FIG. 2, a first converter phase 31 and a second converter phase 32 are diagrammatically represented. The first converter phase 31 comprises a first converter arm 33, a second converter arm 34 and a first AC voltage terminal 35. The second converter phase 32 comprises a third converter arm 36, a fourth converter arm 37 and a second AC voltage terminal 38.

A first parallel circuit 39a, having a series circuit of a diode 40, a capacitor 41 and a freewheeling diode 42, represents a first series circuit of switching modules (corresponding to the series circuit 13b in FIG. 1), wherein the switching modules of the converter arrangement 30 are configured as half-bridge circuits, such that the freewheeling diodes (identified in FIG. 3 by the reference numbers 103, 105) constitute a current path through the switching modules, further to the blocking of the power semiconductors of the switching modules. The series circuits in the remaining converter arms 34, 36 and 37 are correspondingly represented by parallel circuits 39a, c-d.

Each of the converter arms 33, 34, 36, 37 respectively further comprises an arm inductance 43.

The first converter phase 31 extends between a first DC voltage pole 44 and a second DC voltage pole 45. The converter arrangement 30 assumes a symmetrical monopole configuration, such that the first DC voltage pole 44, in service, lies at a negative high-voltage potential, as indicated schematically in FIG. 2 by means of a parallel circuit of a capacitor 46 and an arrester 47. At the same time, the second DC voltage pole 45 lies at a positive high-voltage potential, as indicated schematically in FIG. 2 by means of a parallel circuit of a further capacitor 48 and an arrester 49. A DC voltage UD is present across the two DC voltage poles. A (phase-to-phase) voltage Upp is present between the first and the second AC voltage terminal 35, 38.

With reference to FIG. 2, an example of an asymmetrical AC-side fault will now be described, wherein the second AC voltage terminal 38 is short-circuited to ground, as indicated in FIG. 2 by means of short-circuit symbols 50 (for example, as a result of a line-to-ground fault in the connected AC grid system). The converter arrangement 30 is customarily connected to the AC grid system via a network transformer. In this configuration, the case of a converter-side fault, with respect to the network transformer, is considered here.

In FIG. 2, arrows plotted in the branch circuits indicate the current direction in the event of such a short-circuit. As a result of the short-circuit, a voltage difference AU occurs between a potential point on the first DC voltage pole 44 and a potential point 52 on the first AC voltage terminal, wherein ΔU=Upp+UD/2. This voltage difference can result in an overloading of the capacitor 41 which, as indicated above, constitutes the energy store of the switching modules. However, this overloading is prevented by a phase module arrester 53, which limits the voltage across the capacitor 41. In the second converter arm 34, in the situation represented in FIG. 2, current flows via the freewheeling diodes of the switching modules (represented by one freewheeling diode 54). A further phase module arrester 55 fulfils the corresponding function for the second converter phase 32.

Accordingly, in the event of an asymmetrical short-circuit on the AC side of the converter arrangement, the procedure is as follows: firstly, the power semiconductors of the switching modules are switched to the blocked state. Thereafter, the short-circuit current is at least partially commutated to the phase module arrester. Thereafter, an AC power circuit-breaker is opened.

Figure 3:
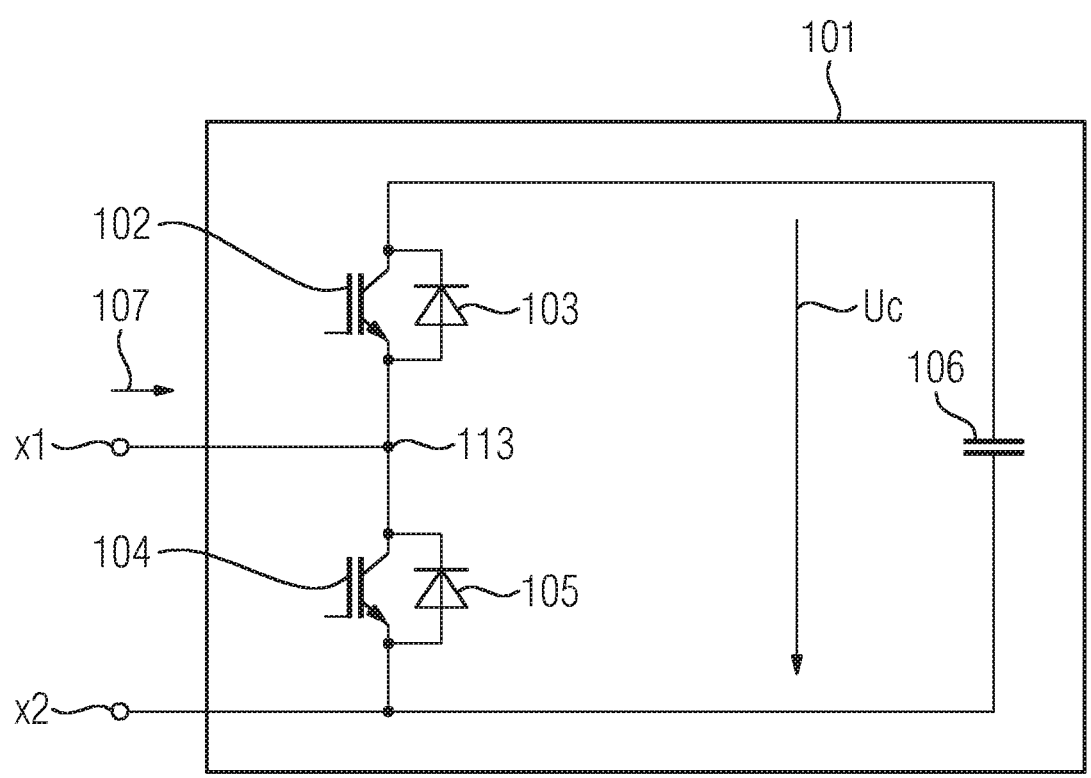
FIG. 3 shows a schematic representation of an example of a switching module for a converter arrangement according to the invention.

FIG. 3 shows a detailed representation of a switching module in the form of a half-bridge circuit 101, which is employable as a switching module 13 in the converter arrangement 1, or also in the converter arrangement 30. The half-bridge circuit 101 comprises two terminals X1 and X2. The terminal X1, for example, can connect the half-bridge circuit 101 to the terminal X2 of a further half-bridge circuit, such that a series circuit of submodules is constituted.

The half-bridge circuit 101 comprises a first semiconductor switch 102 in the form of an insulated gate bipolar transistor (IGBT), to which a freewheeling diode 103 is connected in an antiparallel arrangement. The half-bridge circuit 101 further comprises a second semiconductor switch 104 in the form of an IGBT, to which a freewheeling diode 105 is connected in an antiparallel arrangement. The forward direction of both semiconductor switches 102 and 104 is co-directional. The first terminal X1 is arranged on a potential point 113 between the two semiconductor switches 102 and 104. The second terminal X2 is connected to the emitter of the second semiconductor switch 104.

An energy store in the form of a power capacitor 106 is arranged in parallel with the two semiconductor switches 102, 104. By an appropriate actuation of the semiconductor switches 102, 104, in the event of an operating current direction indicated by an arrow 107, the capacitor 106 can be switched-in or bridged such that, on the terminals X1, X2, either the voltage Uc across the capacitor 106 or a zero voltage is present.

The invention claimed is:

1. A converter arrangement, comprising:
   first and second DC voltage poles;
   a converter phase extending between said first and second DC voltage poles, said converter phase including an AC voltage terminal, a first converter arm extending between said first DC voltage pole and said AC voltage terminal and a second converter arm extending between said AC voltage terminal and said second DC voltage pole;
   said first converter arm including a first series circuit of two-pole switching modules, said second converter arm including a second series circuit of two-pole switching modules, each of said switching modules respectively including power semiconductor switches and an energy store;
   an arrester branch disposed in parallel with said first and second series circuits of switching modules;
   a phase module arrester disposed in said arrester branch and configured for overvoltage protection of said switching modules of said first and second series circuits;
   a first arm inductance disposed in said first converter arm between said first DC voltage pole and said first series circuit of switching modules, and a second arm inductance disposed in said second converter arm between said second DC voltage pole and said second series circuit of switching modules; and
   a first potential point disposed between said first arm inductance and said first series circuit of switching modules, and a second potential point disposed between said second arm inductance and said second series circuit of switching modules, said arrester branch extending between said first potential point and said second potential point;

wherein said phase module arrestor limits charge on all of said two-pole switching modules in said first and second series circuits of switching modules.

2. The converter arrangement according to claim 1, wherein said phase module arrester assumes a protective level in excess of 100 kV.

3. The converter arrangement according to claim 1, wherein said phase module arrester is configured without a housing.

4. The converter arrangement according to claim 1, wherein said power semiconductor switches and said energy store of each respective one of said switching modules are mutually connected in a half-bridge circuit.

5. The converter arrangement according to claim 1, which further comprises an AC-side power circuit-breaker.

6. The converter arrangement according to claim 1, which further comprises TDC-arresters each provided in a respective one of said converter arms and each connected in a respective circuit between one of said converter arms and ground.

7. A method for the short-circuit protection of a converter arrangement, the method comprising the following steps:

providing a converter phase extending between first and second DC voltage poles, the converter phase including an AC voltage terminal, a first converter arm extending between the first DC voltage pole and the AC voltage terminal and a second converter arm extending between the AC voltage terminal and the second DC voltage pole, the first converter arm including a first series circuit of two-pole switching modules, the second converter arm including a second series circuit of two-pole switching modules, each of the switching modules including respective power semiconductor switches and an energy store;

providing a phase module arrester in an arrester branch disposed parallel to the first and second series circuits of switching modules;

providing a first arm inductance in the first converter arm between the first DC voltage pole and the first series circuit of switching modules, and providing a second arm inductance in the second converter arm between the second DC voltage pole and the second series circuit of switching modules;

providing a first potential point between the first arm inductance and the first series circuit of switching modules, and providing a second potential point between the second arm inductance and the second series circuit of switching modules, the arrester branch extending between the first potential point and the second potential point;

providing a power circuit-breaker on an AC side of the converter phase;

detecting an AC-side or a DC-side fault;

placing power semiconductor switches of the switching modules in a blocking state;

commutating a fault current on the phase module arrester, wherein the phase module arrestor limits charge on all of the two-pole switching modules in the first and second series circuits of switching modules; and then opening the power circuit-breaker.

\* \* \* \* \*